2 Sheets--Sheet 1.

J. G. JENNINGS.
Water-Closet.

No. 6,616. Reissued Aug. 24, 1875.

Witnesses.
Otto Hufeland.
Chas Wahler

Inventor.
Josiah George Jennings
p.
Van Santvoord & Hauff
Attys

N. PETERS, PHOTO-LITHOGRAPHER, WASHINGTON, D. C.

J. G. JENNINGS.
Water-Closet.

No. 6,616. Reissued Aug. 24, 1875.

*Witnesses.*
Otto Hufeland
Chas. Wahlers.

*Inventor.*
Josiah George Jennings
pr
Van Santvoord & Hauff
Attys

N. PETERS, PHOTO-LITHOGRAPHER, WASHINGTON, D. C.

UNITED STATES PATENT OFFICE.

JOSIAH GEORGE JENNINGS, OF PALACE WHARF, STANGATE, ENGLAND.

IMPROVEMENT IN WATER-CLOSETS.

Specification forming part of Letters Patent No. 137,082, dated March 25, 1873; reissue No. 6,616, dated August 24, 1875; application filed July 14, 1875.

*To all whom it may concern:*

Be it known that I, JOSIAH GEORGE JENNINGS, of Palace Wharf, Stangate, in the county of Surry, England, sanitary engineer, a subject of the Queen of Great Britain, have invented a new and useful Improvement in Water-Closets, which improvement is fully set forth in the following specification, reference being had to the accompanying drawing, in which—

Figure 1:
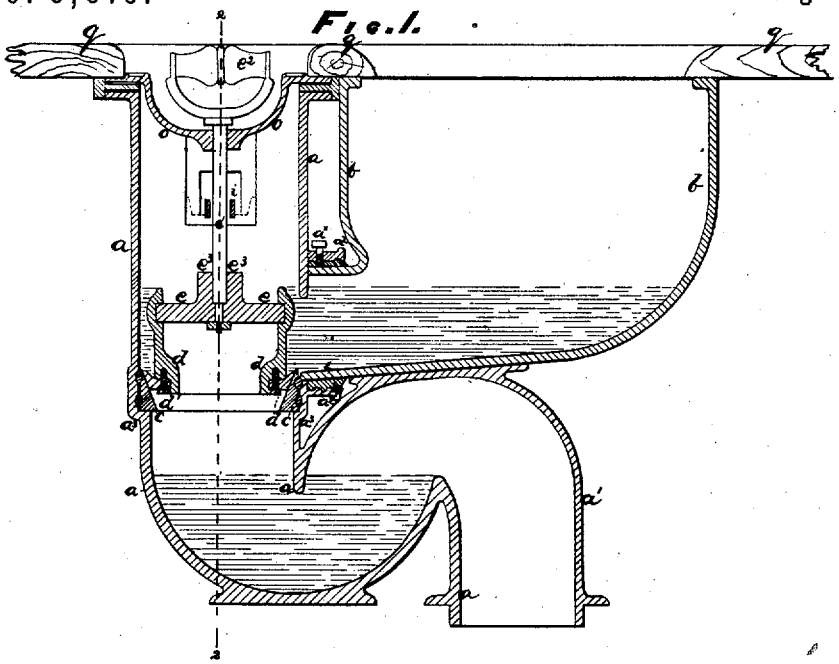
Figure 2:
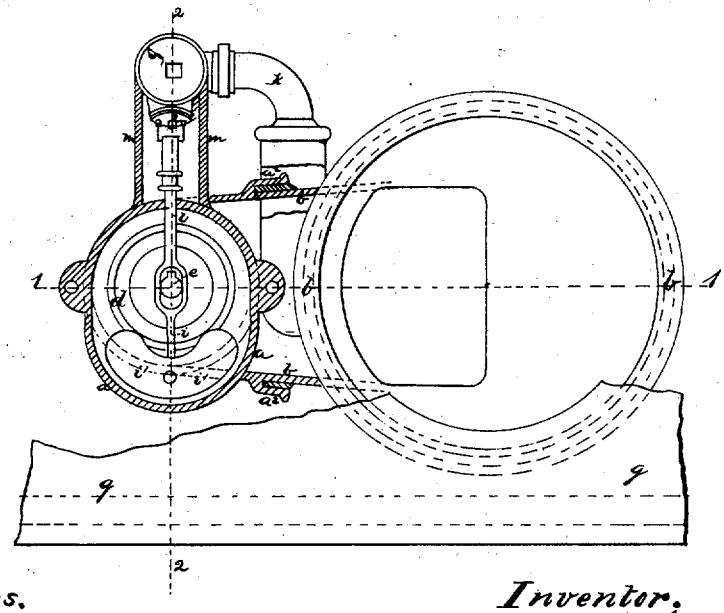
Figure 3:
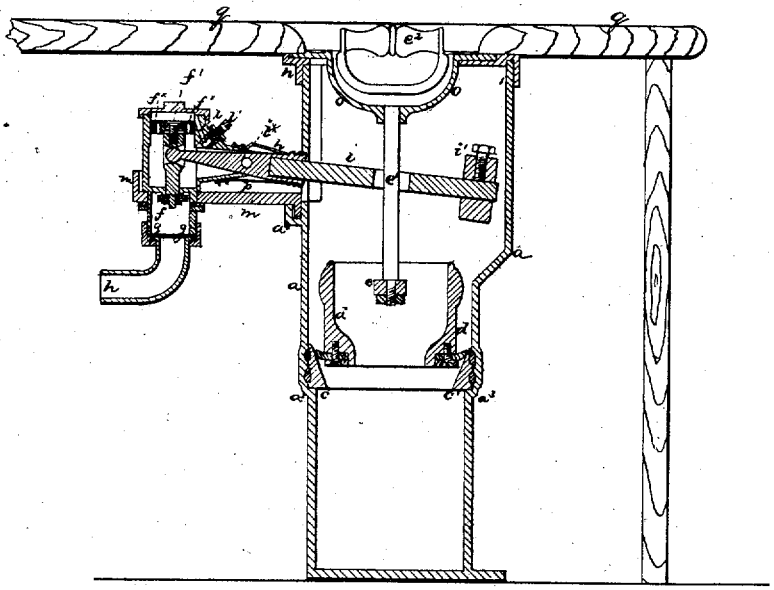

Figure 1 represents a longitudinal section in the plane 1 1, Fig. 2. Fig. 2 is a plan, partly in section. Fig. 3 is a vertical section in the plane 2 2, Figs. 1 and 2.

Similar letters indicate corresponding parts.

This invention relates to certain improvements in water-closets, in which the pan discharges itself, by a side opening, into the upright limb of a siphon-trap, the valve-seat being formed of a ring of glass, clay, or other non-corrosive material, secured in the upright limb of the siphon-trap. Said valve has an overflow-passage formed through it, and its handle passes up through a cap fitted on the upper end of the upright limb of the siphon-trap. The water-supply valve is carried on a bracket, which fits on and against the upper end of the siphon-limb, immediately under the cap, which serves to secure it in its place, and the valve is arranged in such a manner as to be opened by raising a lever, which is lifted with the handle of the discharge-valve. A retarding-piston connected with the supply-valve serves to regulate the quantity of water admitted to the pan whenever the handle is raised. The bracket is made in a trough-like form, so that if the supply-valve should leak at any time, the water so escaping is conducted at once into the trap. The upright siphon-limb is provided with a socket for the reception of the pan.

In the drawing, the letter *b* designates the pan of my water-closet, which communicates, by a passage, $b^0$, with the upright limb of a siphon-trap, *a*. The communication between the pan and the siphon is controlled by a valve, *d*, which is made in the form of a tube or hollow cylinder, and to the lower edge of which is secured a ring, *d'*, of vulcanized india-rubber or other suitable packing material. In the siphon is situated a ring, *c*, of earthenware, glass, or other non-corrosive material, which is dropped down into a shoulder, $a^3$, in the ascending limb of said trap, and fixed in position by suitable cement.

The valve *d*, by its own weight, presses the flexible ring *d'* against the seat *c*, and so makes a tight joint, and allows the water to accumulate in the pan *b* until it flows over the top of the hollow-cylinder valve *d*.

The siphon *a* is, by preference, cast in iron; but it may be of lead or other material. It is formed so as to stand firmly on the floor of the closet through which the descending limb $a^1$ of the trap passes, and by cement, or in other convenient manner, it is securely jointed to the said pipe. On the ascending limb of the piston is formed a socket, $a^2$, into which the discharge-nozzle of the pan *b* fits, and is secured by cement. A screw, $a^*$, Fig. 1, serves to assist in the adjustment of the pan in position before the cement is put in.

In the interior of the cylindrical valve *d* is secured a cross-bar, *e*, to which the rod $e^1$ is fastened by a nut, and on the upper end of this rod is the handle $e^2$, so that, by raising this handle, the valve is lifted and the pan is discharged. The sapply of water to the closet is obtained by a valve so arranged as to discharge, each time it is opened, a regulated quantity of water into the pan before it is again able to close. The supply-pipe *h* connects, by a screw-union, to a chamber, *g*, containing the valve *f*. The pressure of the water tends to keep the valve closed, but it is assisted in doing so by a weight, *i'*, at the end of the lever *i*. This lever turns on the fulcrum $i^*$, secured in lugs which project from the valve-chamber *g*, and its outer end enters a slot in the stem of the valve *f*, which, when the apparatus is at rest, it thus tends to lift. When the handle *e* is raised, however, the nibs $e^3$ $e^3$ on the cross-bar *e* strike the lever *i*, and then the water flows past the valve *f*, and through the pipe *k*, into the pan *b*. At the same time that the valve *f* is opened the piston $f'$ on the upper end of the valve-stem is drawn down. This piston, by a cupped leather, is fitted to the valve-chamber, and, as the same descends, small valves $f^*$ $f^*$ in it open, and allow the water to pass into the upper part of the valve-chamber. The valves $f^*$ are formed of vulcanized india-rubber disks, which are attached to the top of the piston by screws, and cover-holes drilled through it. The water which thus enters the upper part of the valve-chamber prevents the supply-valve from closing immediately the handle $e^2$ is released, for, the valves $f^*$ then closing, the water can only escape through the minute passage $l$, and it requires some time to do this, during which time the supply-valve $f$ remains open. The passage $l$ is provided with a small regulating-tap, $l'$. The valve-chamber $g$ and the apparatus connected therewith are supported by a cast-iron bracket, $m$, which is let into the side of the ascending limb of the siphon. At the bottom it is stepped into a groove, $a^4$, and at the top it is retained by a tap fixed on by a tap-screw. The lid or cover $o$ is also secured in position by means of screws. It serves to close the upper end of the ascending limb of the siphon-trap, and also to guide the valve-rod $e^1$. A vulcanized india-rubber sleeve, $p$, serves to prevent the escape of water around the pivot $i^*$. This, however, is not essential, as any leakage which may take place at this point is, in consequence of the trough-like form of the bracket $m$, led into the trap. The letter $q$ designates the seat and the wood-work of the closet.

What I claim as new, and desire to secure by Letters Patent, is—

1. The non-corrosive valve-seat $c$, in combination with the valve $d$, pan $b$, and siphon-trap $a$, substantially in the manner set forth.

2. The combination of a retarding-piston, $f'$, and a graduated channel, $l$, with the supply-valve and with the pan of a water-closet, whereby the quantity of water admitted to the pan may be regulated substantially as described.

3. The siphon-trap $a$, with a side opening or socket, $a^2$, in the ascending limb thereof, to which a pan, $b$, is adapted, substantially as set forth.

In testimony that I claim the foregoing I have hereunto set my hand and seal this 14th day of May, 1875.

JOSIAH GEORGE JENNINGS. [L.S.]

Witnesses:
JOHN JOLIFFE,
SIDNEY JENNINGS.